(12) United States Patent
Kiani et al.

(10) Patent No.: US 11,133,859 B2
(45) Date of Patent: Sep. 28, 2021

(54) TRANSMIT PHASED ARRAY ANTENNA POINTING SYSTEMS AND METHODS

(71) Applicant: ThinKom Solutions, Inc., Hawthorne, CA (US)

(72) Inventors: Talat Y. Kiani, Mission Viejo, CA (US); William W. Milroy, Torrance, CA (US); Robert M. Skuza, Algonquin, IL (US); Michael S. Geist, Warriors Mark, PA (US); Tony M. Economos, Elburn, IL (US)

(73) Assignee: ThinKom Solutions, Inc., Hawthorne, CA (US)

( * ) Notice: Subject to any disclaimer, the term of this patent is extended or adjusted under 35 U.S.C. 154(b) by 0 days.

(21) Appl. No.: 16/485,945

(22) PCT Filed: Feb. 14, 2018

(86) PCT No.: PCT/US2018/018175
§ 371 (c)(1),
(2) Date: Aug. 14, 2019

(87) PCT Pub. No.: WO2018/152198
PCT Pub. Date: Aug. 23, 2018

(65) Prior Publication Data
US 2020/0021356 A1    Jan. 16, 2020

Related U.S. Application Data

(60) Provisional application No. 62/459,588, filed on Feb. 15, 2017.

(51) Int. Cl.
*H04W 52/42* (2009.01)
*H04B 7/185* (2006.01)
(Continued)

(52) U.S. Cl.
CPC ........... *H04B 7/18508* (2013.01); *H01Q 3/36* (2013.01); *H04B 17/12* (2015.01); *H04W 52/241* (2013.01)

(58) Field of Classification Search
CPC .. B60W 10/20; B60W 2554/80; B60W 30/09; H04W 36/30; H04W 16/28; H04W 52/42
See application file for complete search history.

(56) References Cited

U.S. PATENT DOCUMENTS 5,079,557 A    1/1992  Hopwood et al.
2003/0206132 A1   11/2003  Phelan et al.
(Continued)

FOREIGN PATENT DOCUMENTS

WO    WO 03/094287 A1    11/2003

*Primary Examiner* — Tu X Nguyen
(74) *Attorney, Agent, or Firm* — Kusner & Jaffe

(57) ABSTRACT

Systems and methods for controlling pointing of a transmit antenna aperture of a phased array antenna are described herein. A modem may be configured to modulate carrier wave signals for transmission to an end target via the transmit antenna aperture. A transmit power level of the modem may be monitored, and pointing of the transmit antenna aperture may be adjusted based on the transmit power level. Additionally or alternatively, an indication of a carrier-to-noise level may be received, and pointing of the transmit antenna aperture may be adjusted based on the carrier-to-noise level.

20 Claims, 4 Drawing Sheets

(51) Int. Cl.
   *H04B 17/12*   (2015.01)
   *H01Q 3/36*   (2006.01)
   *H04W 52/24*   (2009.01)

(56) References Cited

U.S. PATENT DOCUMENTS

2009/0315760 A1   12/2009   Mousavi Bafrooei et al.
2013/0044611 A1*   2/2013   Jalali .................. H04B 7/18502
                                                            370/252
2017/0254903 A1*   9/2017   Johnson .................. G01S 3/043

* cited by examiner

300

| First Control | Second Control |
|---|---|
| TX power level | TX power level |
| End Target C/N level | End Target C/N level |
| Another control | Another control |

Figure 3

TRANSMIT PHASED ARRAY ANTENNA POINTING SYSTEMS AND METHODS

RELATED APPLICATION DATA

This application claims priority of U.S. Provisional Application No. 62/459,588 filed on Feb. 15, 2017, which is incorporated herein by reference in its entirety.

FIELD OF THE INVENTION

The following disclosure generally relates to systems and methods for pointing an antenna aperture and thus aiming transmissions between the antenna and a ground communication system.

BACKGROUND

Vehicles in transit, such as aircraft in flight, may engage in bidirectional communication with a ground communication system (e.g., via satellite or via ground-to-air network) to transmit and receive media content, flight information, or other data. An aircraft, for example, may receive a transmission via a receive aperture or opening of an active electronically scanned phased array antenna mounted to the aircraft, and may further send a transmission via a transmit aperture or opening of the same antenna.

Due in part to the long distances between the aircraft, the ground communication system, and/or the satellite, it is important that transmissions between each communication entity be consistently accurately pointed and/or tracked toward a target (e.g., a ground station or a satellite). When the source or destination of a transmission is a moving vehicle such as an aircraft, active steps to maintain accurate pointing and tracking of the antenna apertures become particularly important.

Conventionally, the receive aperture of the antenna utilizes a signal receiver to maintain pointing and tracking in the direction of a source from which a transmission is received (e.g., a satellite or a ground station); and the pointing of the transmit aperture of the antenna is slaved to the receive aperture pointing. This dependency of the pointing of the transmit aperture on the pointing of the receive aperture, however, introduces mechanical discontinuities and vulnerabilities in the transmit aperture pointing, such as induced mispointing and undesirable interference in transmissions.

SUMMARY

This summary is provided to introduce a selection of concepts in a simplified form, with the concepts further described in the detailed description. This summary is not intended to identify key features or essential features of the claimed subject matter, nor is it intended to be used to limit the scope of the claimed subject matter.

In one embodiment, a method of pointing a transmit antenna aperture of a phased array antenna may be provided. The method may include (1) monitoring, via one or more processors, a transmit power level of a modem configured to modulate carrier wave signals for transmission to an end target, wherein the modulated carrier wave signals are transmitted via a transmit antenna aperture of a phased array antenna communicatively connected to the modem; and/or (2) adjusting, via the one or more processors, based on the monitored transmit power level of the modem, the pointing of the transmit antenna aperture. The method may include additional, fewer, or alternate actions, including those described herein.

In another embodiment, a system configured to point a transmit antenna aperture of a phased array antenna may be provided. The system may include (1) a modem configured to modulate carrier wave signals for transmission to an end target; and/or (2) a phased array antenna communicatively connected to the modem and configured to transmit the modulated carrier wave signals to the end target, the phrased array antenna comprising (a) a transmit antenna aperture via which the modulated carrier wave signals are transmitted; and/or (b) a controller comprising one or more processors and one or more computer memories storing thereon computer-executable instructions that, when executed via the one or more processors, cause the system to (i) monitor a transmit power level of the modem; and/or (ii) based on the monitored transmit power level of the modem, adjust the pointing of the transmit antenna aperture. The system may include additional, fewer, or alternate components and/or functions thereof, including those described herein.

In another embodiment, a method of controlling a pointing of a transmit antenna aperture of a phased array antenna may be provided. The method may include (i) employing, via one or more processors, a first control loop to control a pointing of the transmit antenna aperture; (ii) determining, via the one or more processors, during the employing of the first control loop, that a metric associated with the first control loop exceeds a predetermined maximum or minimum threshold; and/or (iii) in response to the determination that the metric associated with the first control loop exceeds the predetermined maximum or minimum threshold, employing, via the one or more processors, a second control loop in lieu of the first control loop to control the pointing of the transmit antenna aperture. The method may include additional, fewer, or alternate actions, including those described herein.

In another embodiment, a system configured to control a pointing of a transmit antenna aperture of a phased array antenna may be provided. The system may include (1) a modem configured to modulate carrier wave signals for transmission to an end target via a satellite; and/or (2) a phased array antenna communicatively connected to the modem and configured to transmit the modulated carrier wave signals to the satellite, the phrased array antenna comprising (a) a transmit antenna aperture via which the modulated carrier wave signals are transmitted; and/or (b) a controller comprising one or more processors and one or more computer memories storing thereon computer-executable instructions that, when executed via the one or more processors, cause the system to (i) employ a first control loop to control a pointing of the transmit antenna aperture; (ii) determine, during the employing of the first control loop, that a metric associated with the first control loop exceeds a predetermined maximum or minimum threshold; and/or (iii) in response to the determination that the metric associated with the first control loop exceeds the predetermined maximum or minimum threshold, employ a second control loop in lieu of the first control loop to control the pointing of the transmit antenna aperture. The system may include additional, fewer, or alternate components and/or functions thereof, including those described herein.

BRIEF DESCRIPTION OF THE DRAWINGS

FIG. 3 illustrates a multiplicity of possible control means and combinations of means for controlling pointing of a transmit aperture of a phased array antenna.

DETAILED DESCRIPTION

Figure 1:
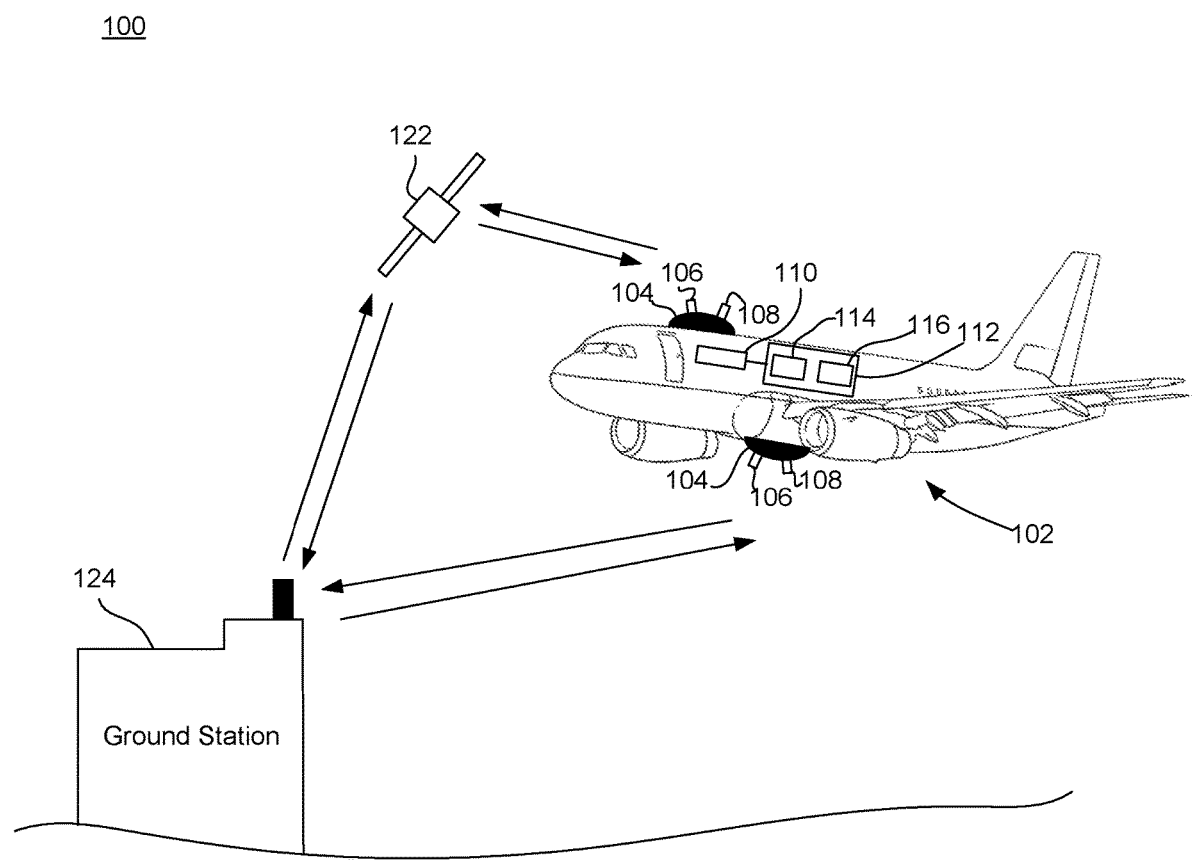
FIG. 1 illustrates an example system configured to control pointing of a transmit aperture of a phased array antenna mounted to an aircraft.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Conventionally, vehicles in transit, such as aircraft in flight, may engage in bidirectional communication with a ground communication system (e.g., via satellite or via ground-to-air network) to transmit and receive media content, flight information, or other data. An aircraft, for example, may receive a transmission via a receive (RX) aperture or opening of an phased array antenna (e.g., an active electronically scanned phased array antenna) mounted to the aircraft, and may further send a transmission via a transmit (TX) aperture or opening of the same antenna.

Due in part to the long distances between the aircraft, the ground communication system, and/or the satellite, it is important that transmissions between each communication entity be consistently accurately pointed and/or tracked toward a target (e.g., a ground station or a satellite). When the source or destination of a transmission is a moving vehicle such as an aircraft, active steps to maintain accurate pointing and tracking of both TX and RX antenna apertures become particularly important.

Conventionally, the RX aperture of the antenna utilizes a signal receiver to maintain pointing and tracking in the direction of a source from which a transmission is received (e.g., a satellite or a ground station); and the pointing of the TX aperture of the antenna is slaved to (i.e., dependent on) the RX aperture pointing.

This dependency of the pointing of the TX aperture on the pointing of the RX aperture, however, may introduce a finite amount of mechanical discontinuity (e.g., 0.05 degrees). Given the large distance between a source and destination of a transmission (e.g., between an aircraft and a satellite, or between an aircraft and a ground or base station) even such a small angular TX mispointing may induce critical interference and/or other noise in a transmission. Further, the dependence of TX pointing on RX pointing may introduce other vulnerabilities. For example, adjacent satellite interference (ASI) may negatively impact the pointing of the RX aperture, and thus also the TX aperture. Further, some other involuntary error or voluntary tampering (e.g., by a malicious actor) may negatively impact the pointing of the RX aperture, and thus also the TX aperture. In short, slaving the TX aperture pointing to the RX aperture pointing may not only introduce inherent problems, but may also allow any unintentional inaccuracies in the RX aperture pointing to be transferred to the TX aperture pointing.

At least to address these problems, the present disclosure generally introduces methods and systems via which a pointing of a TX phased array antenna aperture may be controlled independently or mutually exclusively of a pointing of an RX aperture of the same phased array antenna. Thus, the present disclosure describes improvements in the field of telecommunications, and in particular, improvements in the field of transmit antenna pointing.

FIG. 1 illustrates an example system 100 configured to control pointing of a transmit (TX) aperture 106 of a phased array antenna 104 (e.g., an active electronically scanned array (AESA) antenna) mounted on an aircraft 102 for communication via one or more communication links with a terrestrial ground station 124. While an aircraft 102 is depicted and described herein, it should be understood that the phased array antenna 104 mounted on the aircraft 102 may instead be mounted on another type of vehicle (e.g., a car, truck, train, and/or boat, any of which may be in motion), and the transmissions described herein may be between the other type of vehicle and yet another entity (e.g., a ground station, a satellite, and/or yet another vehicle). Additionally or alternatively, the phased array antenna 104 may be mounted on a stationary entity (e.g., the ground station 124), and the transmissions described herein may be transmissions via a link between the stationary entity and yet another entity (e.g., a vehicle such as the aircraft 102, a satellite, and/or yet another ground station). In other words, while FIG. 1 illustrates one embodiment, various other configurations and arrangements may be possible, as will be evident from this detailed description.

In any case, the phased array antenna 104 may comprise the TX aperture 106 and/or a receive (RX) aperture 108. Wireless transmissions that include signaling and/or data may be sent from the aircraft 102 via the TX aperture 106, and/or wireless transmissions that include signaling and/or data may be received onto the aircraft 102 via the RX aperture 108 of the phased array antenna 104. In the embodiment illustrated in FIG. 1, control of the pointing of the TX aperture 106 is independent of (e.g., mutually exclusive of) control of the pointing of the RX aperture 108. That is, control of the TX aperture 106 is not tied or dependent on the control of RX aperture 108, and vice versa.

In some embodiments, the communication link between the aircraft 102 and the ground station 124 may be achieved in part via a satellite 122 or other intermediary. For example, a transmission from the aircraft 102 to the ground station 124 may include transmission from the TX aperture 106 of the phased array antenna 104 to the satellite 122, and the contents of which may be subsequently transmitted from the satellite 122 to the ground station 124. Thus, in this example, the pointing of the TX aperture 106 may be a pointing at least generally in the direction of the satellite 122. Accordingly, it should be understood that, as described herein, a transmission between any first entity (or "origin") and any second entity (or "end target") may, in some embodiments, involve additional intermediaries, such as the satellite 122, that may be situated or disposed communicatively between the first and second entities. Further, it should be understood that, in these embodiments, a pointing of the TX aperture 106 of the phased array antenna 104 may refer to a pointing at least generally in the direction of a satellite 122 or other intermediary, with the transmission reaching the end target via the intermediary.

In some embodiments, a communication link between the aircraft 102 and the ground station 124 may be a direct air-to-ground link, e.g., a broadband link operating in unlicensed spectrum (such as the 2.4 GHz or 5 GHz frequency spectrum) or a broadband link operating in licensed spectrum, either of which may utilize any known or suitable wireless communication protocol, such as CDMA, GSM, LTE, and/or another type of terrestrial cellular communication protocol, variant thereof, or improvement thereto). In at least these embodiments, it should be understood that the satellite 122 or intermediary may be omitted from the system 100, and transmissions may proceed between the "origin" TX aperture 106 as an and the "end target" ground station 124 without any intermediary target.

In any case, via the TX aperture 106 of the phased array antenna 104, signals may be transmitted to a target (e.g., an end target ground station 124 or an intermediary target satellite 122). To avoid interference and/or other noise in a transmission, the transmission should generally be pointed in the direction of the target's location or anticipated location.

A modem 110 may be included at the aircraft 102. The modem 110 may be configured to modulate carrier wave signals to be transmitted via the TX aperture 106 of the phased array antenna 104. Transmissions may be accomplished via the phased array antenna 104 mounted on the top of the aircraft 102, the phased array antenna 104 mounted on the bottom of the aircraft 102, some other phased array antenna mounted to the aircraft 102, or some combination of the above. It should be understood that the activity and placement of phased array antennas 104 may vary, in some embodiments. The transmissions described herein may include transmissions of frequencies in the L, S, C, X, Ku, K, Ka, 2.4 GHz, 5 GHz, 800 MHz, and/or any other suitable bands, including those described in this detailed description.

A transmit (TX) power level may be associated with operation of the modem 110. The TX power level of the modem 110 (e.g., indicating the power of the modulated carrier wave signals transmitted via the modem 110) may be a reliable indicator of accurate or inaccurate pointing of the TX aperture 106 of the phased array antenna 104. For example, a mispointing of the TX aperture 106 may induce a high TX power level to compensate for the mispointing. Subsequently, when the TX pointing accuracy is improved, the improvement may be reflected in a reduction in the TX power level.

Such fluctuations or changes in the TX power level may be monitored at the modem 110, via a controller 112 communicatively connected to the modem 110. The controller may include one or more processors 114 and one or more computer memories 116 storing computer-executable instructions that, when executed via the one or more processors 114, cause the controller 112 to perform actions of the controller 112 or other actions of the system 100 described herein.

The controller 112 may be configured to monitor the TX power level of the modem, and based on the monitored TX power level of the modem, adjust the pointing of the TX aperture 106 of the phased array antenna 104. For example, if the monitored TX power level reaches a high magnitude, the controller may cause adjustment of the TX aperture 106 to effect more accurate pointing of the TX aperture 160 toward a target and thus reduce the TX power level. In an embodiment, control of the pointing of the TX aperture 160 is primarily based on the monitored and/or measured TX power level. In an embodiment, the control of the pointing of the TX aperture 160 is solely based on the monitored and/or measured TX power level.

However, the monitoring of the TX power level and adjustment of the TX aperture 106 based upon the monitored TX power level is just one means by which the pointing of the TX aperture 106 may be controlled or adjusted. Another means of controlling or adjusting the pointing of the TX aperture 106 may include receiving, at the controller (e.g., via the end target, the satellite 122, and/or the RX aperture 108) one or more signals indicative of a carrier-to-noise (C/N) level or ratio as measured at the end target. For example, the C/N ratio may be measured at an end target ground station 124 and transmitted back to the controller 112 at the aircraft 102 (e.g., via the satellite 122 and the RX aperture 108 of the phased array antenna 104). The C/N level may be a ratio of the modulated carrier wave signal (corresponding to the modem 110) to noise present in the link between the transmission origin and the end target, and like the TX power level, may be utilized to determine accurate or inaccurate pointing of the TX aperture 106 of the phased array antenna 104. For example, a low C/N ratio (i.e., less signal to more noise) measured at the ground station 124 may be indicative of inaccurate pointing of the TX aperture 106 toward the ground station 124 (or toward a target satellite 122). Based on a received indication of the C/N level, the controller may cause an adjustment in the pointing of the TX aperture 106, thus improving pointing accuracy and in turn improving a later C/N ratio measured at the end target. In an embodiment, control of the pointing of the TX aperture 160 is primarily based on the monitored and/or measured C/N level as detected by the end target. In an embodiment, the control of the pointing of the TX aperture 160 is solely based on the monitored and/or measured C/N level as detected by the end target.

In some embodiments, the controller 112 may cause adjustment of the TX aperture 106 pointing based on a combination of the TX power level and the C/N level. For example, the controller 112 may, as a first means of control, monitor the TX power level and adjust the pointing of the TX aperture 106 based on the monitored TX power level. The controller 112 may determine, at some point in time, that the TX power level exceeds a predetermined maximum threshold. The TX power level exceeding the predetermined maximum TX threshold may be indicative of a severe (or larger than desired) mispointing of the TX aperture 106, and accordingly, monitoring and adjustment based on the TX power level alone may not be sufficient for accurate TX aperture pointing. In response to determining that the TX power level has exceeded the predetermined maximum threshold, the controller 112 may switch to a second means of control, e.g., the controller 112 may receive (e.g., via the ground station 124, the satellite 122, and/or the RX aperture 108), at least one signal indicative of the C/N level as measured at the end target, and adjust the pointing of the TX aperture 106 based on the measured C/N level. Meanwhile, the controller may continue to monitor the TX power level.

At some point after switching to using the C/N level for TX pointing adjustment, the controller 112 may determine that the TX power level has fallen below the previously exceeded maximum threshold, and/or below a predetermined reversion threshold which, for example, may provide some hysteresis while switching between the two modes of pointing control. In response to determining that the TX power status has fallen below the predetermined reversion threshold, the controller 112 may revert to adjusting the pointing of the TX aperture 106 based on the monitored TX power level. The predetermined reversion threshold may be a value less than the predetermined maximum threshold by a predetermined amount (e.g., by a margin of ten percent, or any desired amount). In other words, to prevent constant switching between the two above-described means of pointing the TX aperture 106, the controller 112 may not revert to pointing the TX aperture 106 based on the TX power level unless the TX power level is a safe amount under the maximum.

In other possible embodiments, the roles of the two above described means of pointing the TX aperture 106 may be reversed. In other words, the controller 112 may first control/adjust the pointing of the TX aperture 106 based on the measured C/N level. The controller 112 may determine that the measured C/N level has exceeded, fallen below, met or passed a predetermined maximum threshold or minimum threshold associated with the C/N level and, in response, switch to controlling/adjusting the pointing of the TX aperture 106 based on the monitored TX power level. The predetermined reversion threshold may be associated with the C/N level, and when the measured C/N level falls below the predetermined reversion threshold, the controller 112 may revert to adjusting the pointing of the TX aperture 106 based on the measured C/N value.

In still other possible embodiments, at least one of the above-described means of pointing the TX aperture 106 may be combined with other suitable means of pointing the TX aperture 106. For example, the controller 112 may adjust the pointing of the TX aperture 106 based on the monitored/measured TX power level, but switch to another suitable means of pointing adjustment when the TX power level exceeds a predetermined maximum threshold, and employ the other suitable means until the TX power level has fallen below the predetermined reversion threshold.

In some embodiments, the controller 112 may implement within a control loop any of the means described herein for adjustment of the pointing of the TX aperture 106. For example, a first control loop may include monitoring the TX power level of the modem 110 and adjusting the pointing of the TX aperture 106 based on the monitored TX power level. In other words, via the control loop, the controller 112 may continuously or iteratively monitor the TX power level and adjust the pointing of the TX aperture 106 accordingly. A second control loop may include monitoring the C/N ratio or level detected by the end-target, and adjusting the pointing of the TX aperture 106 based on the monitored C/N ratio or level. In other words, via the second control loop, the controller 112 may continuously or iteratively monitor the C/N ratio or level detected by the end-target and adjust the pointing of the TX aperture 106 accordingly.

Using the above described techniques, the TX aperture 106 may be pointed independently of the RX aperture 108. The independent pointing may be a mutually independent pointing of the TX aperture 106 and the RX aperture 108 (i.e., TX aperture 106 pointing does not affect RX aperture 108 pointing, while RX aperture 108 pointing does not affect TX aperture 106 pointing). As a result of independent (e.g., mutually independent) pointing) of the TX aperture 106 with respect to the pointing of the RX aperture 108, any problems, errors, or inaccuracies in pointing of the RX aperture 108 may avoid transfer to the pointing of the TX aperture 106, and vice versa.

Unless specifically indicated otherwise, the words "a" and "an" in reference to components of the system 100 are used simply for ease of description, and are not intended to be limiting. In other words, where a component or an entity is described, one or more components and/or one or more entities may be possible. For example, it is understood that, in some embodiments, the aircraft 102 may be outfitted with one or more phased array antennas 104. Further, during a course of flight of the aircraft 102, the aircraft 102 may establish or maintain one or more communications links with one or more satellites 122 (e.g., a handoff process) and/or one or more ground stations 124 via one or more respective phased transmit antenna arrays 104. Furthermore, transmission of any single communication may involve additional components (e.g., additional relay stations and/or satellites) not illustrated in FIG. 1. Furthermore, it should be understood that, depending on the configuration of an embodiment of the system 100, at least one of the two phased array antennas 104 illustrated in FIG. 1 may be omitted. For example, if no transmissions to a satellite take place in an embodiment, the top-mounted phased array antenna 104 may be omitted from the system 100. Of course, any number of any of the techniques, principles, features, and/or concepts discussed herein apply equally to a top-mounted phased array antenna 104 utilized for satellite or other air-to-air communications, or to a phased array antenna 104 that is utilized for direct air-to-ground communications.

Figure 2:
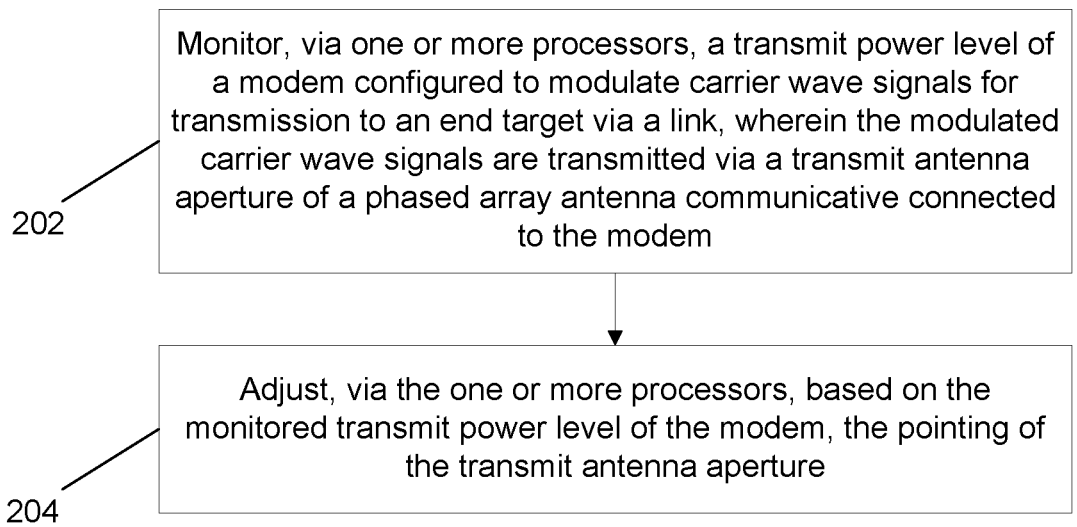
FIG. 2 illustrates a method of pointing a transmit aperture of a phased array antenna.

FIG. 2 illustrates an example method 200 of pointing a transmit antenna aperture of a phased array antenna (e.g., an active electronically scanned array (AESA) antenna). The method 200 may be implemented by the system 100 of FIG. 1 (e.g., at the controller 112), or another suitable system including those described herein. For clarity of discussion, though, and not for limitation purposes, the method 200 is described herein with respect to the system 100 of FIG. 1.

The method 200 may include monitoring, via one or more processors, a transmit power level of a modem configured to modulate carrier wave signals for transmission to an end target via a link, wherein the modulated carrier wave signals are transmitted via a transmit antenna aperture of a phased array antenna communicatively connected to the modem (block 202).

In some embodiments, the phased array antenna may be fixedly connected to a vehicle in transit (e.g., mounted on a vehicle in transit). In these embodiments, the end target may include, for example, another vehicle in transit and/or a terrestrial ground station.

In other embodiments, the phased array antenna may be connected or mounted to some other entity, such a terrestrial ground station. In these embodiments, the end target may include, for example, another terrestrial ground station or a vehicle in transit.

The link may be implemented in any one or more of the L, S, C, X, Ku, K, Ka, 2.4 GHz, 5 GHz, or 800 MHz frequency bands, and/or in any other suitable licensed or unlicensed frequency band, including those described herein. In some implementations, the link is established between the source (e.g., the vehicle in transit) and an intermediary disposed between the source and the end-target (e.g., a satellite). In some implementations, the link is established directly between the source and the end-target without any intervening intermediary.

The method 200 may also include adjusting, via the one or more processors, based on the monitored transmit power level of the modem (e.g., based on one or more fluctuations of the monitored transmit power level), the pointing of the transmit antenna aperture (block 404).

Adjustment of the pointing of the transmit antenna aperture may include adjustment of the pointing at least generally in the direction of a target. The target may, in some embodiments, be the end target. For example, in the case of a 2.4 GHz LTE broadband link between an aircraft and a ground station, adjustment of the pointing may include adjustment of the pointing of the transmit antenna aperture of the aircraft-mounted phased array antenna in the direction of the ground station. In other embodiments, the target may be an intermediary target situated communicatively between the transmit antenna aperture and the end target. In these embodiments, adjusting the pointing of the transmit antenna aperture may include pointing the transmit antenna aperture in the direction of the intermediary target, with the intermediary target relaying the transmission (directly or indirectly) to the end target. For example, a satellite may be situated communicatively between the transmit antenna aperture of an aircraft-mounted antenna and a terrestrial ground station, and a transmission may be transmitted from the transmit antenna aperture to the satellite, and relayed (directly or indirectly) to the terrestrial ground station.

In some embodiments, the method 200 may additionally or alternatively include determining, via the one or more processors, that the transmit power level of the modem exceeds a predetermined maximum threshold, and/or in response to the determination that the transmit power level exceeds the predetermined maximum threshold, switching to operating at least partially in another mode to control or adjust the pointing of the TX antenna aperture. In an embodiment, the other mode may include (i) receiving an indication of a carrier-to-noise (C/N) ratio or level, as measured at the end target, of the link via which the modulated carrier wave signals are received at the end target, and (ii) based on the measured carrier-to-noise level of the link, adjusting the pointing of the transmit antenna aperture. The indication of the C/N ratio or level may be based on a signal that is received, for example, via a RX antenna aperture that is communicatively connected to the modem, and as such the C/N ratio or level may, for example, correspond to the modem via which the carrier wave signals are modulated.

Still further, in some embodiments, the method 200 may further include determining, via the one or more processors, that the transmit power level of the modem has met or fallen below a predetermined reversion threshold, and in response to the determination that the transmit power level has met or fallen below the predetermined reversion threshold, reverting, via the one or more processors, to adjusting the pointing of the transmit antenna aperture based on the monitored transmit power level of the modem. The predetermined reversion threshold may, for example, by a value that is less than the predetermined maximum threshold by a predetermined amount (e.g., ten percent).

In other embodiments, roles of the two above described means of pointing the transmit antenna aperture 106 may be reversed. In other words, the method 200 may, for example, including adjusting the pointing of the transmit antenna aperture 106 based on the measured C/N level as detected by the end-target. The method 200 may further include determining that the measured C/N level has exceeded, fallen below, met, or passed a predetermined maximum threshold or predetermined minimum threshold associated with the C/N level, and in response to the determination, adjusting of the pointing of the transmit antenna aperture 106 based on the monitored TX power level as detected at the modem. The predetermined reversion threshold may be associated with the C/N level, and the method 200 may further include determining that the measured C/N level has met, passed, exceeded, or fallen below the predetermined reversion threshold, and in response to the determination, reverting to adjusting the pointing of the transmit antenna aperture 106 based on the measured C/N value.

In still other possible embodiments, at least one of the above-described means of pointing the transmit antenna aperture 106 may be combined with other suitable means of pointing the transmit antenna aperture 106. For example, the method 200 may generally include pointing of transmit antenna aperture based on the monitored TX power level as detected at the modem, but then pointing the transmit antenna aperture by another suitable means when the TX power level exceeds the predetermined maximum threshold, and until the TX power level has fallen below the predetermined reversion threshold.

Any of the above-described embodiments of the method 200 may be implemented, in some embodiments, as a control loop. In other words, the method 200 may include, for example, employing a first control loop, wherein the TX power level is continuously or iteratively monitored at the modem, and wherein the pointing of the transmit antenna aperture is continuously or iteratively adjusted based on the monitored TX power level. If the TX power level exceeds the predetermined maximum threshold, the method 200 may include incorporating a second control loop in lieu of the first control loop, wherein the second control loop includes continuously or iteratively monitoring the measured C/N level as detected by the end target (e.g., based on a signal received at the modem), and pointing the transmit antenna aperture based on the measured C/N level.

In any case, it should be understood that, via the method 200, the transmit antenna aperture may be pointed independently of the pointing of a receive (RX) antenna aperture of the same phased array antenna. The independent pointing may be a mutually exclusive pointing of the transmit antenna aperture and the receive antenna aperture (i.e., transmit antenna aperture pointing does not affect receive antenna aperture pointing, and receive antenna aperture pointing does not affect transmit antenna aperture pointing). In other words, the receive antenna aperture may be pointed via a means mutually independent of the pointing of the transmit antenna aperture. As a result of independent (e.g., mutually independent) pointing of the transmit antenna aperture, any problems, errors, or inaccuracies in pointing of the receive antenna aperture, such as those caused by error, malice, or adjacent satellite interference (ASI), may avoid transfer to the pointing of the transmit antenna aperture, and vice versa.

FIG. 3 illustrates a multiplicity of possible control means and combinations of means for controlling pointing of a transmit antenna aperture of a phased array antenna. As should be evident from the table 300, any listed first means of controlling the pointing of the transmit antenna aperture ("First Control") may be combined with listed any second means of controlling the pointing of the transmit antenna aperture ("Second Control"). Control of the pointing of the transmit antenna aperture may be accomplished, for example, via the systems and methods described herein.

For example, the first control means may include using the measured or monitored transmit (TX) power level of the modem (or fluctuations therein) to control the transmit antenna aperture pointing. In the event that control based on the TX power level is not sufficient (e.g., when the TX power level exceeds a predetermined maximum threshold), the pointing of the transmit antenna aperture may be controlled at least in part based on a second control means, such as controlling based on the carrier-to-noise (C/N) level as measured at the end target.

As should be understood from the table 300, controlling the pointing transmit antenna aperture may be combined with another suitable means of control. For example, another means of control may be utilized as a first control, while the TX power level and/or the end target C/N level is utilized as a second control.

Figure 4:
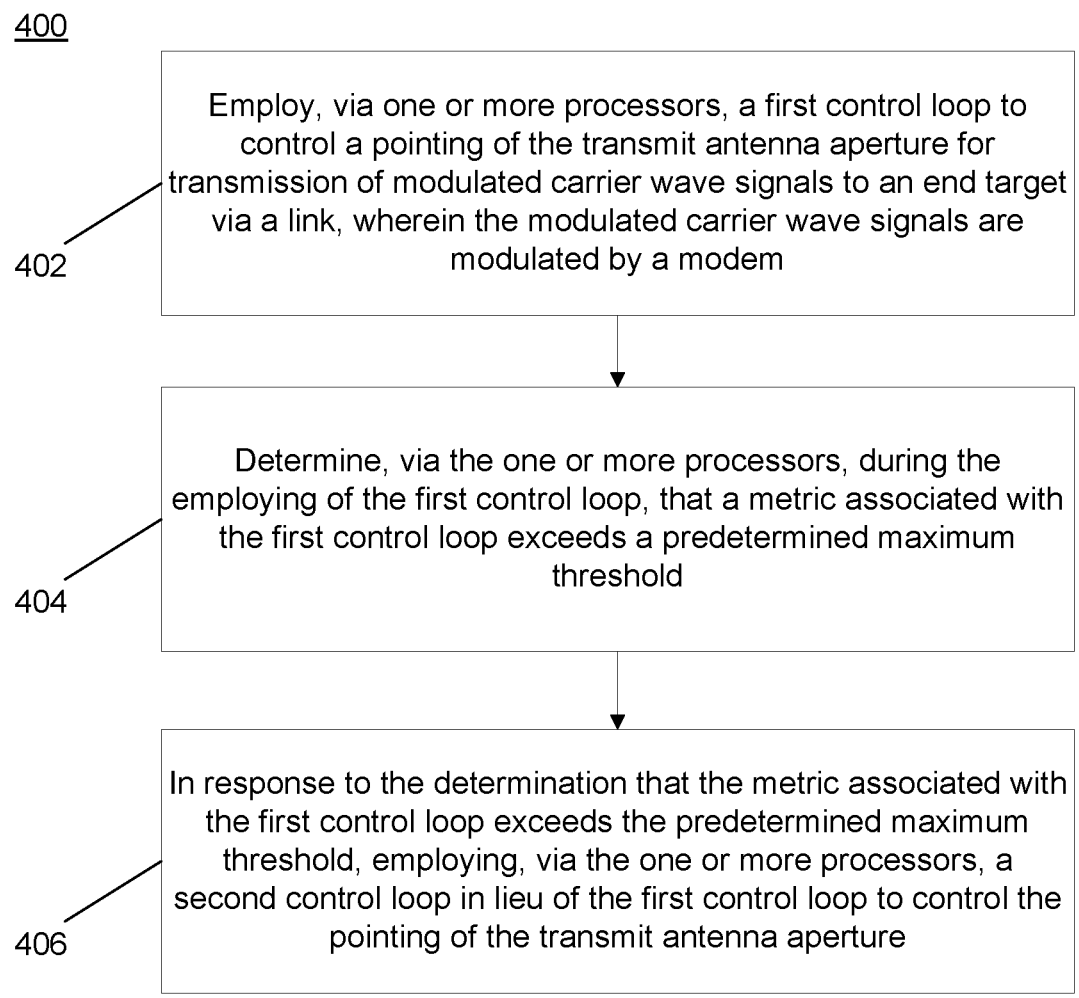
FIG. 4 illustrates a method of controlling pointing of a transmit aperture of as phased array antenna.

The concepts described with respect to FIG. 3 may be applied to any one or more portions of the method 200 of FIG. 2, and/or any one or more portions of the method 400 of FIG. 4, for example.

FIG. 4 illustrates an example method 400 of controlling a pointing of a transmit antenna aperture of a phased array antenna (e.g., an active electronically scanned array (AESA) antenna). The method 400 may be implemented by the system 100 of FIG. 1 (e.g., at the controller 112), or another suitable system including those described herein. Additionally or alternatively, any one or more portions of the method 400 may operate in conjunction with any one or more portions of the method 200, in an embodiment. For clarity of discussion, though, and not for limitation purposes, the method 400 is described herein with respect to the system 100 of FIG. 1.

The method 400 may include employing, via one or more processors, a first control loop to control a pointing of the transmit antenna aperture for transmission of modulated carrier wave signals to an end target via a link, wherein the modulated carrier wave signals are modulated by a modem (block 402).

In some embodiments, the phased array antenna may be fixedly connected to a vehicle in transit (e.g., mounted on a vehicle in transit). In these embodiments, the end target may include, for example, another vehicle in transit and/or a terrestrial ground station.

In other embodiments, the phased array antenna may be connected or mounted to some other entity, such a terrestrial ground station. In these embodiments, the end target may include, for example, another terrestrial ground station or a vehicle in transit.

The link may be implemented in any one or more of the L, S, C, X, Ku, K, Ka, 2.4 GHz, 5 GHz, or 800 MHz frequency bands, and/or in any other suitable licensed or unlicensed frequency band, including those described herein. In some implementations, the link is established between the source (e.g., the vehicle in transit) and an intermediary disposed between the source and the end-target (e.g., a satellite). In some implementations, the link is established directly between the source and the end-target without any intervening intermediary.

Control of the pointing of the transmit antenna aperture may include adjustment of the pointing at least generally in the direction of a target. The target may, in some embodiments, be the end target. For example, in the case of a 2.4 GHz LTE broadband link between an aircraft and a ground station, control of the pointing may include adjustment of the pointing of the transmit antenna aperture of the aircraft-mounted phased array antenna in the direction of the ground station. In other embodiments, the target may be an intermediary target situated communicatively between the transmit antenna aperture and the end target. In these embodiments, controlling the pointing of the transmit antenna aperture may include pointing the transmit antenna aperture in the direction of the intermediary target, with the intermediary target relaying the transmission (directly or indirectly) to the end target. For example, a satellite may be situated communicatively between the transmit antenna aperture of an aircraft-mounted antenna and a terrestrial ground station, and a transmission may be transmitted from the transmit antenna aperture to the satellite, and relayed (directly or indirectly) to the terrestrial ground station.

In some embodiments, the first control loop may include (i) monitoring or measuring a transmit power level at the modem, and (ii) based on the monitored transmit power level at the modem, adjusting the pointing of the transmit antenna aperture. In other embodiments, the first control loop may include (i) receiving an indication of a carrier-to-noise (C/N) ratio or level (e.g., a carrier-to-noise ratio or level associated with the modem), as measured or detected at the end target, of the link via which the modulated carrier wave signals are received at the end target, and (ii) based on the measured/detected carrier-to-noise level of the link, adjusting the pointing of the transmit antenna aperture. The indication of the C/N ratio or level may be based on a signal that is received, for example, via a RX antenna aperture that is communicatively connected to the modem. In still other embodiments, the first control loop may include other elements.

The method 400 may also include determining, via the one or more processors, during the employing of the first control loop, that a metric associated with the first control loop exceeds a predetermined maximum or minimum threshold (block 404). In some embodiments, for example, wherein the first control loop comprises monitoring the transmit power level of the modem, the metric may be the transmit power level or a magnitude of a fluctuation therein over a particular interval of time. In other embodiments, wherein the first control loop comprises receiving an indication of a measured C/N ratio or level as detected at the end target, the metric may be the measured C/N level or a magnitude of a fluctuation therein over a particular interval of time.

The method 400 may also include, in response to the determination that the metric associated with the first control loop exceeds the predetermined maximum or minimum threshold, employing, via the one or more processors, a second control loop in lieu of the first control loop to control the pointing of the transmit antenna aperture (block 406).

In some embodiments, the second control loop may include (i) receiving an indication of a carrier-to-noise (C/N) ratio or level (e.g., a carrier-to-noise level associated with the modem), as measured at the end target, of the link via which the modulated carrier wave signals are received at the end target, and (ii) based on the measured carrier-to-noise level of the link, adjusting the pointing of the transmit antenna aperture. The indication of the C/N ratio or level may be based on a signal that is received, for example, via a RX antenna aperture that is communicatively connected to the modem. In other embodiments, the second control loop may include (i) monitoring a transmit power level at the modem, and (ii) based on the monitored transmit power level of the modem, adjusting the pointing of the transmit antenna aperture. In still other embodiments, the second control loop may include other elements.

In some embodiments, the method 400 may further include (i) determining, via the one or more processors, during the employing of the second control loop, that the metric associated with the first control loop has met, passed, exceeded, or fallen below a predetermined reversion threshold, and/or (ii) in response to the determination that the metric associated with the first control loop has met, passed, exceeded, or fallen below the predetermined reversion threshold, reverting, via the one or more processors, to employing the first control loop in lieu of the second control loop to control the pointing of the transmit antenna aperture. The predetermined reversion threshold may, for example, be a value that is less than a value of the predetermined maximum threshold or greater than a value of a predetermined minimum threshold by a predetermined amount (e.g., ten percent).

In any case, it should be understood that, via the method 400, pointing of the transmit antenna aperture may be controlled independently of the pointing of a receive (RX) antenna aperture of the same phased array antenna. The independent pointing control may be a mutually exclusive pointing control of the transmit antenna aperture and pointing control of the receive antenna aperture (i.e., control of the transmit antenna aperture pointing does not affect receive antenna aperture pointing, and control of the receive antenna aperture pointing does not affect transmit antenna aperture pointing). In other words, pointing of the receive antenna aperture may be controlled via another one or more control loops that are independent or mutually independent of the one or more control loops utilized to control the pointing of the transmit antenna aperture. As a result of independent (e.g., mutually independent) control pointing of the transmit antenna aperture, any problems, errors, or inaccuracies in pointing of the receive antenna aperture, such as those caused by error, malice, or adjacent satellite interference (ASI) may avoid transfer to the pointing of the transmit antenna aperture, and vice versa.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

While pointing of a transmit aperture of a phased array antenna is described herein, it should be appreciated that the concepts described herein may be applied to other types of antennas, unless indicated otherwise. For example, in some embodiments, the phased array antenna may instead be a single antenna without a phased array. Further, while the phased array antenna described herein is generally described as being mounted on an aircraft, it should be appreciated that the phased array antenna may additionally or alternatively be mounted on another type of vehicle (e.g., a car, truck, train, or boat), or mounted on some other system (e.g., a ground station).

Unless specifically stated otherwise, discussions herein using words such as "pointing," "aiming," "directing," in reference to a transmit (TX) and/or a receive (RX) antenna aperture of a phased array antenna or another antenna may refer to the directing of the antenna aperture (or "opening"). Hence, a "pointing," "aiming," or "directing," of the transmit antenna aperture may refer to a direction that signals are to be transmitted via the transmit antenna aperture or opening. A "pointing," "aiming," or "directing," of the receive antenna aperture may refer to a direction via which the receive antenna aperture or opening is exposed to receive signals from, for example, a satellite and/or a ground station.

Further, a pointing, aiming, or directing of an antenna aperture may refer to a pointing of the antenna aperture at least generally toward another entity (e.g., a transmit antenna aperture may "lead" a target of a transmitted signal, given a known or estimated signal travel time).

While the transmit and receive antenna apertures herein are generally described as being communicatively connected to a same modem, it should be understood that, in some embodiments, the transmit antenna aperture and the receive antenna aperture may be communicatively connected to separate modems. Further, in some embodiments, one or more modems may be fixedly and/or communicatively connected to an entity (e.g., a vehicle such as an aircraft in transit or another vehicle in transit, a ground station, etc.), and/or the entity may include more than one transmit aperture and/or receive aperture. For example, a vehicle such as an aircraft may include a first transmit aperture to transmit modulated carrier wave signals to a satellite, and a second transmit aperture to transmit modulated carrier wave signals to a ground station. As another example, a vehicle such as an aircraft may include a first receive aperture to receive signals via a satellite, and a second transmit aperture to receive signals via a ground station.

In some embodiments, a ground station may include or be communicatively connected to a teleport antenna and/or a modem platform hub. Further, in some embodiments, an entity (e.g., an airplane) to which an antenna (e.g., an AESA antenna) is mounted and/or communicatively connected may include and/or be communicatively connected (directly or indirectly) to a KRFU, a KANDU, and/or a MODMAN.

As used herein, a "forward link" may refer to a transmission pathway via which signals are transmitted via a ground station to a recipient (e.g., an aircraft or another vehicle or entity). A "return link" may refer to a transmission pathway via which signals are transmitted via a sender (e.g., an aircraft or another vehicle or entity to a ground station. An intermediary such as a satellite may be communicatively situated within the forward link and/or the return link.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A method of controlling pointing of a transmit antenna aperture of a phased array antenna, the phased array antenna including a receive antenna aperture, the method comprising:
   monitoring, via one or more processors, a transmit power level of a modem configured to modulate carrier wave signals for transmission to an end target, wherein the modulated carrier wave signals are transmitted via a transmit antenna aperture of a phased array antenna communicatively connected to the modem; and
   adjusting, via the one or more processors and based on the monitored transmit power level of the modem, the pointing of the transmit antenna aperture,
   wherein said monitoring the transmit power level is performed independent of the receive antenna aperture.

2. The method of claim 1, further comprising:
   determining, via the one or more processors, that the transmit power level of the modem exceeds a predetermined maximum threshold; and
   in response to the determination that the transmit power level exceeds the predetermined maximum threshold:
   receiving at least one signal indicative of a carrier-to-noise level, as measured at the end target, of a link via which the modulated carrier wave signals are received at the end target; and
   based on the measured carrier-to-noise level of the link, adjusting the pointing of the transmit antenna aperture.

3. The method of claim 2, wherein the measured carrier-to-noise level corresponds to the modem from which the carrier wave signals are modulated.

4. The method of claim 2, further comprising:
   determining, via the one or more processors, that the transmit power level of the modem has fallen below a predetermined reversion threshold; and
   in response to the determination that the transmit power level has fallen below the predetermined reversion threshold, reverting, via the one or more processors, to adjusting the pointing of the transmit antenna aperture based on the monitored transmit power level of the modem.

5. The method of claim 4, wherein a value of the predetermined reversion threshold is less than a value of the predetermined maximum threshold by a predetermined amount.

6. The method of claim 1, wherein the adjusting of the pointing of the transmit antenna aperture based on the monitored transmit power level of the modem comprises adjusting of the pointing of the transmit antenna aperture based on one or more fluctuations of the monitored transmit power level of the modem.

7. The method of claim 1, wherein
   adjusting the pointing of the receive antenna aperture is independent of the adjusting of the pointing of the transmit antenna aperture.

8. The method of claim 1, wherein:
   the modem and the phased array antenna are fixedly connected to a vehicle in transit; and
   the end target comprises a terrestrial ground station.

9. The method of claim 8, wherein the vehicle is an aircraft.

10. The method of claim 1, wherein the carrier wave signals are transmitted via one of the L, S, C, X, Ku, K, Ka, 2.4 GHz, 5 GHz, or 800 MHz frequency bands, or via another licensed or unlicensed wireless communications frequency band.

11. The method of claim 1, wherein adjusting the pointing of the transmit antenna aperture includes adjusting the transmit antenna aperture to point toward the end target.

12. The method of claim 1, wherein the modulated carrier wave signals are transmitted from the transmit antenna aperture to the end target via a satellite, and wherein adjusting the pointing of the transmit antenna aperture includes adjusting the transmit antenna aperture to point toward the satellite.

13. The method according to claim 1, wherein monitoring, via one or more processors, a transmit power level of a modem includes monitoring the transmit power level at the modem.

14. A system configured to control pointing of a transmit antenna aperture of a phased array antenna, the system comprising:
   a modem configured to modulate carrier wave signals for transmission to an end target; and
   a phased array antenna communicatively connected to the modem and configured to transmit the modulated carrier wave signals via a link, the phased array antenna comprising:
   a receive antenna aperture;

a transmit antenna aperture via which the modulated carrier wave signals are transmitted via the link; and a controller comprising one or more processors and one or more computer memories storing thereon computer-executable instructions that, when executed via the one or more processors, cause the system to:

monitor a transmit power level at the modem; and based on the monitored transmit power level of the modem, adjust the pointing of the transmit antenna aperture, wherein the controller is configured to monitor the transmit power level independent of the receive antenna aperture.

15. The system of claim 14 configured to perform the method of claim 1.

16. The system of claim 14, wherein the computer-executable instructions, when executed via the one or more processors, further cause the system to:

determine that the transmit power level of the modem exceeds a predetermined maximum threshold; and in response to the determination that the transmit power level exceeds the predetermined maximum threshold:

receive at least one signal indicative of a carrier-to-noise level, as measured at the end target, of the link via which the modulated carrier wave signals are received at the end target; and based on the measured carrier-to-noise level of the link, adjust the pointing of the transmit antenna aperture.

17. The system of claim 16, wherein the computer-executable instructions, when executed via the one or more processors, further cause the system to:

determine, that the transmit power level of the modem has fallen below a predetermined reversion threshold; and in response to the determination that the transmit power level has fallen below the predetermined reversion threshold, revert to adjusting the pointing of the transmit antenna aperture based on the monitored transmit power level of the modem.

18. The system of claim 14, wherein the measured carrier-to-noise level corresponds to the modem from which the carrier wave signals are modulated.

19. The system of claim 17, wherein a value of the predetermined reversion threshold is less than a value of the predetermined maximum threshold by a predetermined amount.

20. The system of claim 14, wherein the adjusting of the pointing of the transmit antenna aperture based on the monitored transmit power level of the modem comprises adjusting of the pointing of the transmit antenna aperture based on one or more fluctuations of the monitored transmit power level of the modem.

* * * * *